(12) United States Patent
Kato

(10) Patent No.: US 10,974,414 B2
(45) Date of Patent: Apr. 13, 2021

(54) COATED PRODUCT MANUFACTURING METHOD AND MANUFACTURING DEVICE

(71) Applicant: KATOMOKUZAI KOGYO CO., LTD., Kasugai (JP)

(72) Inventor: Hisaya Kato, Kasugai (JP)

(73) Assignee: KATOMOKUZAI KOGYO CO., LTD., Kasugai (JP)

( * ) Notice: Subject to any disclaimer, the term of this patent is extended or adjusted under 35 U.S.C. 154(b) by 0 days.

(21) Appl. No.: 16/979,647

(22) PCT Filed: Mar. 20, 2019

(86) PCT No.: PCT/JP2019/011911
§ 371 (c)(1),
(2) Date: Sep. 10, 2020

(87) PCT Pub. No.: WO2019/188728
PCT Pub. Date: Oct. 3, 2019

(65) Prior Publication Data
US 2021/0023738 A1   Jan. 28, 2021

(30) Foreign Application Priority Data

Mar. 30, 2018   (JP) .............................. JP2018-069584

(51) Int. Cl.
*B27M 3/00*   (2006.01)
*B32B 38/00*   (2006.01)
(Continued)

(52) U.S. Cl.
CPC .............. *B27M 3/00* (2013.01); *B29C 63/04* (2013.01); *B29C 65/48* (2013.01); *B32B 21/14* (2013.01);
(Continued)

(58) Field of Classification Search
CPC ...... B29C 63/04; B29C 63/042; B29C 63/046
See application file for complete search history.

(56) References Cited

U.S. PATENT DOCUMENTS 5,514,238 A * 5/1996 Mauduit ................ B27D 5/003
156/201
7,842,151 B2   11/2010 Kato
2008/0216945 A1   9/2008 Kato

FOREIGN PATENT DOCUMENTS

DE   3736739 A1 * 5/1989 ........... B29C 63/044
EP   2 147 773 A2   1/2010
(Continued)

OTHER PUBLICATIONS

International Search Report dated May 14, 2019 in PCT/JP2019/011911 filed on Mar. 20, 2019, 2 pages.

*Primary Examiner* — Barbara J Musser
(74) *Attorney, Agent, or Firm* — Oblon, McClelland, Maier & Neustadt, L.L.P.

(57) ABSTRACT

A method for manufacturing a coated product for suppressing the occurrence of sagging or cracking at an outer corner curved surface part of a coated product, includes: transporting a laminate in which a decorative material is bonded to a surface of the substrate; heating a bending margin of the decorative material projecting outward from a side surface of the substrate during transport of the laminate; and bending the bending margin heated in the heating step during transport of the laminate in a non-heated state to bond the bending margin to the side surface of the substrate. During heating, the bending margin being heated is bent in a half-folded state toward the side surface of the substrate. During bonding, the bending margin bent in the half-folded state in the heating step is further bent to be bonded to the side surface of the substrate.

7 Claims, 9 Drawing Sheets

(51) Int. Cl.
  *B32B 21/14* (2006.01)
  *B32B 37/02* (2006.01)
  *B29C 63/04* (2006.01)
  *B29C 65/48* (2006.01)
  *B27D 5/00* (2006.01)

(52) U.S. Cl.
  CPC .......... *B32B 37/02* (2013.01); *B32B 38/0012* (2013.01); *B27D 5/003* (2013.01)

(56) References Cited

FOREIGN PATENT DOCUMENTS

| | | |
|---|---|---|
| JP | 3054815 U | 12/1998 |
| JP | 2004-66750 A | 3/2004 |
| JP | 2004-358873 A | 12/2004 |
| JP | 2008-62385 A | 3/2008 |

\* cited by examiner (a)

(b)

(a)

(b)

(c)

(a)

(b)

(c)

(a)

(b)

COATED PRODUCT MANUFACTURING METHOD AND MANUFACTURING DEVICE

TECHNICAL FIELD

The present invention relates to a method and a device for manufacturing a coated product, and more particularly to a method and a device for manufacturing a coated product in which a surface and a side surface of a substrate are coated with a decorative material.

BACKGROUND ART

As a conventional coated product, a product in which a surface and a side surface of a substrate are coated with a decorative material is generally known. This coated product is widely used as building materials for various counters, top boards, doors, floors, walls, and the like. Generally known as a method for manufacturing this coated product is, for example, a method including a step of, during transport of a laminate in which a decorative material is bonded to a surface of a substrate, heating a bending margin of the decorative material projecting outward from a side surface of the substrate, and then a bonding step of bending the heated bending margin in a non-heated state to bond the bending margin to the side surface of the substrate (also referred to as "post-forming") (see, for example, Patent Literature 1).

CITATIONS LIST

Patent Literature

Patent Literature 1: JP 2008-62385 A

SUMMARY OF INVENTION

Technical Problems

However, in the above-described conventional method for manufacturing a coated product, the bending margin of the decorative material being heated in the heating step is not subjected to any external force, and thus extends and undulates due to heat so that it may not be uniformly heated. In that case, sagging or cracking is likely to occur at an outer corner curved surface part of the coated product. In addition, in the above-described conventional method for manufacturing a coated product, in the bonding step, the bending margin of the decorative material is bent at a stretch in a non-heated state and bonded to the side surface of the substrate, and, at the time of bonding, a tip of the bending margin is not restricted. Therefore, the bending margin cannot be smoothly bent, and thus may not be bonded to an appropriate position on the side surface of the substrate. In that case, sagging or cracking is likely to occur at an outer corner curved surface part of the coated product. The sagging or cracking at the outer corner curved surface part of the coated product is likely to occur particularly when the outer corner curved surface part of the coated product has an extremely small radius of curvature (for example, 1 to 5 mm).

Here, the sagging at the outer corner curved surface part of the coated product is usually formed at a leading side (for example, 50 to 60 mm) of transport of the laminate and is hardly formed at portions other than the leading side, at the outer corner curved surface part on one side of the coated product, and is not so conspicuous. However, for example, as shown in FIG. 11, in a coated product 1 in which a plurality of side surfaces 2b of a substrate 2 are coated with a decorative material 3, sagging parts H are conspicuous at intersections of respective outer corner curved surface parts 4 on two adjacent sides, leading to deterioration in design. Further, for example, as shown in FIG. 12, in a connected product 1A obtained by connecting a plurality of the coated products 1, the sagging parts H are conspicuous at connection portions of the outer corner curved surface parts 4 of the coated products 1, leading to deterioration in design.

The present invention has been made in view of the actual situation, and an object of the present invention is to provide a method and a device for manufacturing a coated product that can suppress the occurrence of sagging or cracking at an outer corner curved surface part of a coated product even when the outer corner curved surface part of the coated product has an extremely small radius of curvature.

Solutions to Problems

The present invention is as follows.

1. A method for manufacturing a coated product in which a surface and a side surface of a substrate are coated with a decorative material, the method including:
   a transport step of transporting a laminate in which the decorative material is bonded to the surface of the substrate;
   a heating step of heating a bending margin of the decorative material projecting outward from the side surface of the substrate during transport of the laminate; and
   a bonding step of bending the bending margin heated in the heating step during transport of the laminate in a non-heated state to bond the bending margin to the side surface of the substrate,
   wherein, in the heating step, the bending margin being heated is bent in a half-folded state toward the side surface of the substrate, and
   wherein, in the bonding step, the bending margin bent in the half-folded state in the heating step is further bent to be bonded to the side surface of the substrate.

2. The method for manufacturing a coated product according to 1, wherein, in the bonding step, a tip of the bending margin is brought into abutment on an abutment base when the bending margin is bonded to the side surface of the substrate.

3. The method for manufacturing a coated product according to 1 or 2,
   wherein, in the heating step, the bending margin is heated by a heater and bent by a first bending member that is arranged so as to face the heater, and
   wherein, in the bonding step, the bending margin is bent by a second bending member that is arranged so as to be spaced apart from the heater on a downstream side in a transport direction of the laminate.

4. The method for manufacturing a coated product according to 3, wherein the first bending member is provided so as to be switchable between a facing state in which it faces the heater and a retracting state in which it retracts to a lateral side of the heater.

5. The method for manufacturing a coated product according to claim 3 or 4, wherein, in the heating step, the bending margin is bent by being brought into abutment on an inclined surface formed in the first bending member.

6. The method for manufacturing a coated product according to any one of 1 to 5, wherein, in the heating step, the bending margin is bent at a bending angle of 30 to 70% of the total bending angle when the bending margin is bonded to the side surface of the substrate.

7. A device for manufacturing a coated product in which a surface and a side surface of a substrate are coated with a decorative material, the device including:

a transport unit that transports a laminate in which the decorative material is bonded to the surface of the substrate;

a heating unit that heats a bending margin of the decorative material projecting outward from the side surface of the substrate during transport of the laminate; and a bonding unit that bonds the bending margin heated in the heating unit during transport of the laminate in a non-heated state to bond the bending margin to the side surface of the substrate, wherein the heating units bends the bending margin being heated in a half-folded state toward the side surface of the substrate, and wherein the bonding unit further bends the bending margin bent in the half-folded state in the heating step to bond the bending margin to the side surface of the substrate.

Advantageous Effects of Invention

The method for manufacturing a coated product according to the present invention includes a transport step of transporting a laminate in which a decorative material is bonded to a surface of the substrate; a heating step of heating a bending margin of the decorative material projecting outward from a side surface of the substrate during transport of the laminate; and a bonding step of bending the bending margin heated in the heating step during transport of the laminate in a non-heated state to bond the bending margin to the side surface of the substrate. In the heating step, the bending margin being heated is bent in a half-folded state toward the side surface of the substrate. In the bonding step, the bending margin bent in the half-folded state in the heating step is further bent to be bonded to the side surface of the substrate. Accordingly, in the heating step, the bending margin being heated is bent in the half-folded state, so that the bending margin is suppressed from undulating so that the bending margin is uniformly heated. Further, in the bonding step, the bending margin bent in the half-folded state is bent in the non-heated state, the bending margin is smoothly bent and bonded to an appropriate position on the side surface of the substrate. As a result, even when the outer corner curved surface part of the coated product has an extremely small radius of curvature, the occurrence of sagging or cracking at the outer corner curved surface part of the coated product is suppressed.

Further, in the case where, in the bonding step, the tip of the bending margin is brought into abutment on the abutment base when the bending margin is bonded to the side surface of the substrate, the tip of the bending margin is restricted by the abutment base at the time of bonding the bending margin, so that the bending margin is more smoothly bent and bonded to a more appropriate position on the side surface of the substrate.

Further, in the case where, in the heating step, the bending margin is heated by a heater and bent by a first bending member that is arranged so as to face the heater, and, in the bonding step, the bending margin is bent by a second bending member that is arranged so as to be spaced apart from the heater on a downstream side in a transport direction of the laminate, the bending margin being heated by the heater is effectively bent by the first bending member, and effectively bent by the second bending members in the non-heated state.

Further, in the case where the first bending member is provided so as to be switchable between a facing state in which it faces the heater and a retracting state in which it retracts to a lateral side of the heater, the first bending member is switched between the facing state and the retracting state depending on the transport state of the laminate, so that overheating of the first bending member by the heater is suppressed, and that the bending margin is effectively bent by the first bending part.

In the case where, in the heating step, the bending margin is bent by being brought into abutment on an inclined surface formed in the first bending member, the bending margin is effectively bent by the first bending part.

Further, in the case where, in the heating step, the bending margin is bent at a bending angle of 30 to 70% of the total bending angle when the bending margin is bonded to the side surface of the substrate, the bending margin is effectively bent by the first and second bending members.

The device for manufacturing a coated product of the present invention includes: a transport unit that transports a laminate in which the decorative material is bonded to the surface of the substrate; a heating unit that heats a bending margin of the decorative material projecting outward from the side surface of the substrate during transport of the laminate; and a bonding unit that bonds the bending margin heated in the heating unit during transport of the laminate in a non-heated state to bond the bending margin to the side surface of the substrate. The heating unit bends the bending margin being heated in a half-folded state toward the side surface of the substrate, and the bonding unit further bends the bending margin bent in the half-folded state in the heating unit to bond the bending margin to the side surface of the substrate. Thus, in the heating unit, the bending margin being heated is bent in the half-folded state, so that the bending margin is suppressed from undulating so that the bending margin is uniformly heated. Further, in the bonding unit, the bending margin bent in the half-folded state is bent in the non-heated state, so that the bending margin is smoothly bent and bonded to an appropriate position on the side surface of the substrate. As a result, even when the outer corner curved surface part of the coated product has an extremely small radius of curvature, the occurrence of sagging or cracking at the outer corner curved surface part of the coated product is suppressed.

BRIEF DESCRIPTION OF DRAWINGS

The present invention will be further described in the following detailed description with reference to the following figures, given non-limiting examples of exemplary embodiments according to the invention, and like reference symbols represent identical parts through several figures.

DESCRIPTION OF EMBODIMENTS

The particulars described herein are given by way of example and for the purpose of illustrative discussion of the embodiments of the present invention, and are presented for the purpose of providing what is believed to be the description from which the principles and conceptual features of the present invention can be most effectively and readily understood. In this regard, no attempt is made to show structural details of the present invention in more detail than is necessary for the fundamental understanding of the present invention, and the description is taken with the drawings making apparent to those skilled in the art how several forms of the present invention may be embodied in practice.

<Method for Manufacturing Coated Product>

Figure 7:
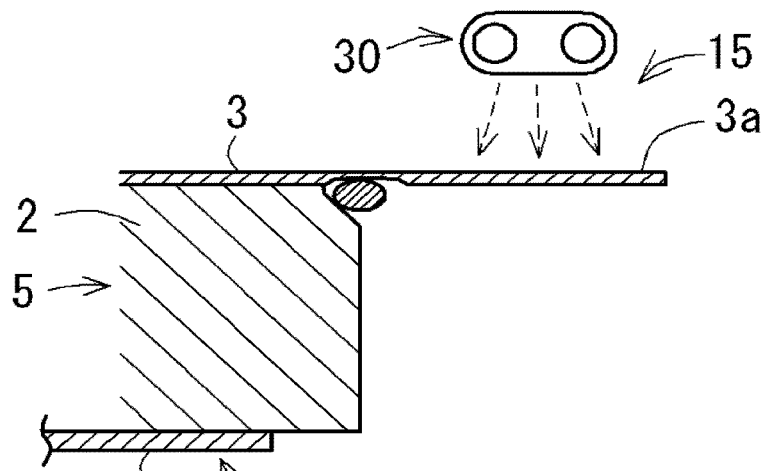
FIG. 7 is an explanatory view for explaining the method for manufacturing a coated product, in which (a), (b) and (c) show a step of heating a bending margin of the decorative material.
Figure 7:
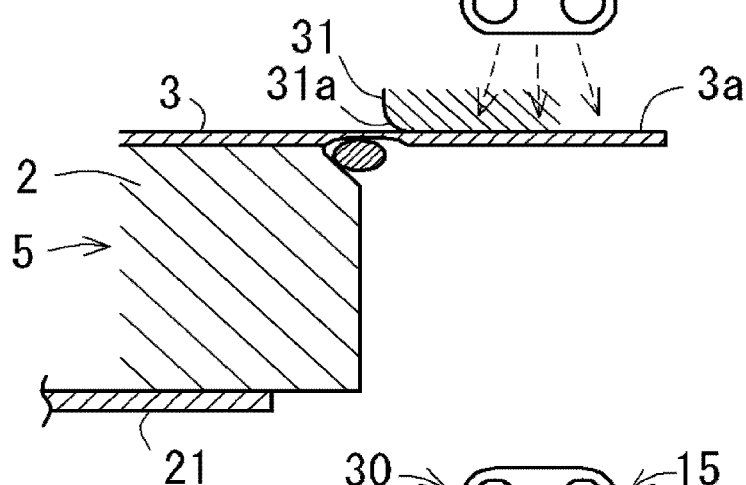
Figure 7:
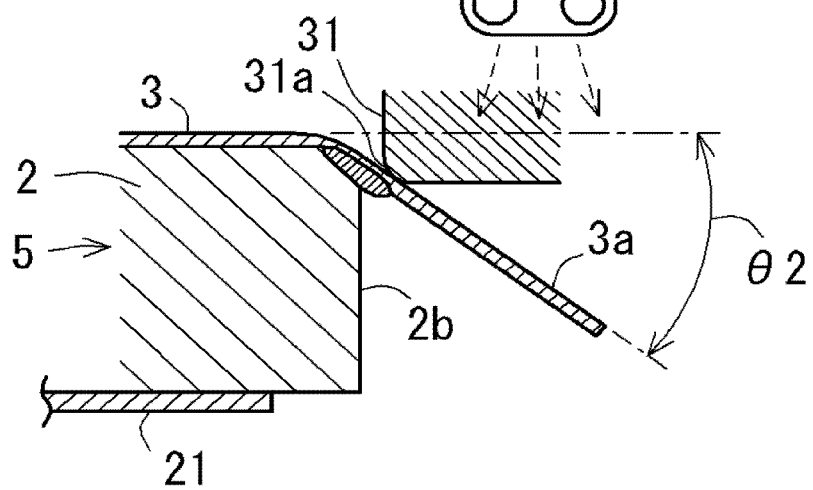
Figure 8:
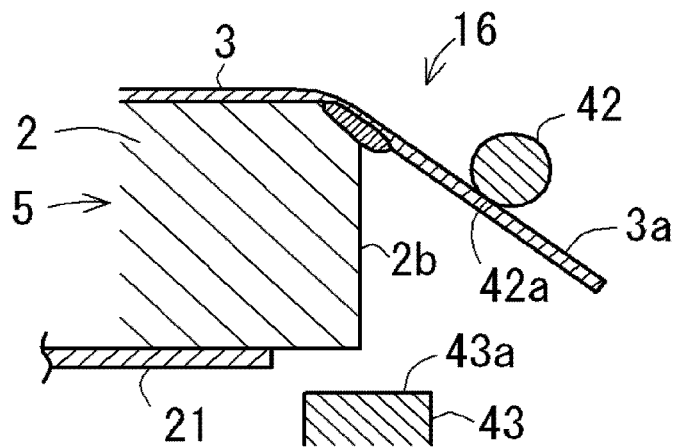
FIG. 8 is an explanatory view for explaining the method for manufacturing a coated product, in which (a) and (b) show a step of bonding the bending margin of the decorative material, and (c) shows a step of trimming a tip of the bending margin of the decorative material.
Figure 8:
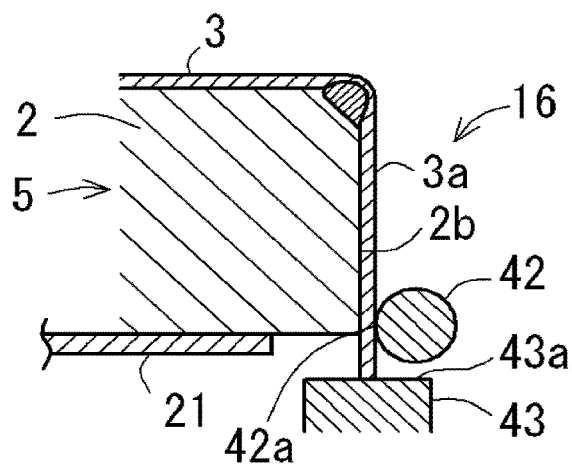
Figure 8:
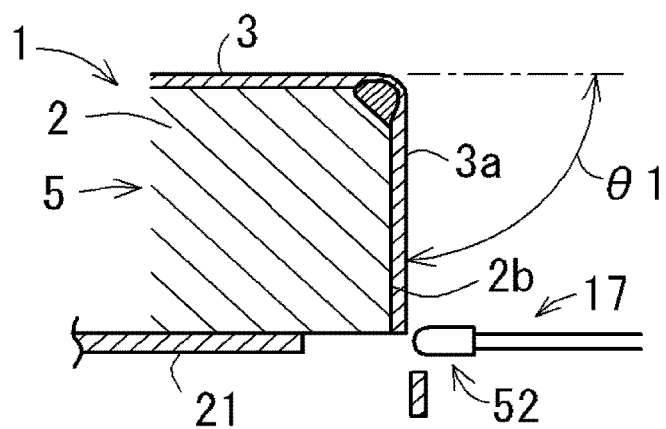

The method for manufacturing a coated product according to the present embodiment is a method for manufacturing a coated product (1) in which a surface (2a) and a side surface (2b) of a substrate (2) are coated with a decorative material (3), the method including a transport step of transporting a laminate (5) in which a decorative material (3) is bonded to a surface (2a) of the substrate; a heating step of heating a bending margin (3a) of the decorative material (3) projecting outward from a side surface (2b) of the substrate during transport of the laminate; and a bonding step of bending the bending margin (3a) heated in the heating step during transport of the laminate in a non-heated state to bond the bending margin to the side surface (2b) of the substrate (see, for example, FIGS. 7 and 8). In the heating step, the bending margin (3a) being heated is bent in a half-folded state toward the side surface (2b) of the substrate. In the bonding step, the bending margin (3a) bent in the half-folded state in the heating step is further bent to be bonded to the side surface (2b) of the substrate.

The "non-heated state" refers to a state in which the bending margin is not heated without being substantially affected by a heat source such as a heater. Further, the "half-folded state" refers to a state in which the bending margin of the decorative material is bent without being in contact with the side surface of the substrate. The material, shape, size and the like of the substrate (2) are not particularly limited. Examples of the material for the substrate include wood-based materials such as particle board, medium density fiberboard (MDF), wood veneer and wood plywood. The material, shape, size and the like of the decorative material (3) are not particularly limited. Examples of the material for the decorative material include thermosetting resins such as melamine resin, diallyl phthalate resin and polyester resin. Further, examples of forms of the decorative material include a composite material obtained by laminating paper and/or a resin sheet and a medium density fiberboard (MDF), and a composite material obtained by laminating a metal foil and a resin sheet. Further, in the heating step, for example, the bending margin can be heated in a state where a hot-melt adhesive is applied to a back surface of the bending margin (3a) of the decorative material and/or the side surface (2b) of the substrate. These points are similarly applied, for example, to a device for manufacturing a coated product according to an embodiment which will be described later, and other methods and devices for manufacturing a coated product.

As the method for manufacturing a coated product according to the present embodiment, there is indicated, for example, a form in which, in the bonding step, a tip of the bending margin (3a) is brought into abutment on an abutment base (43) when the bending margin (3a) is bonded to the side surface (2b) of the substrate (see, for example, FIG. 8(b)). In this case, for example, the abutment base (43) can be provided so that the height position can be adjusted with respect to a frame (36) side (see, for example, FIG. 4).

Figure 3:
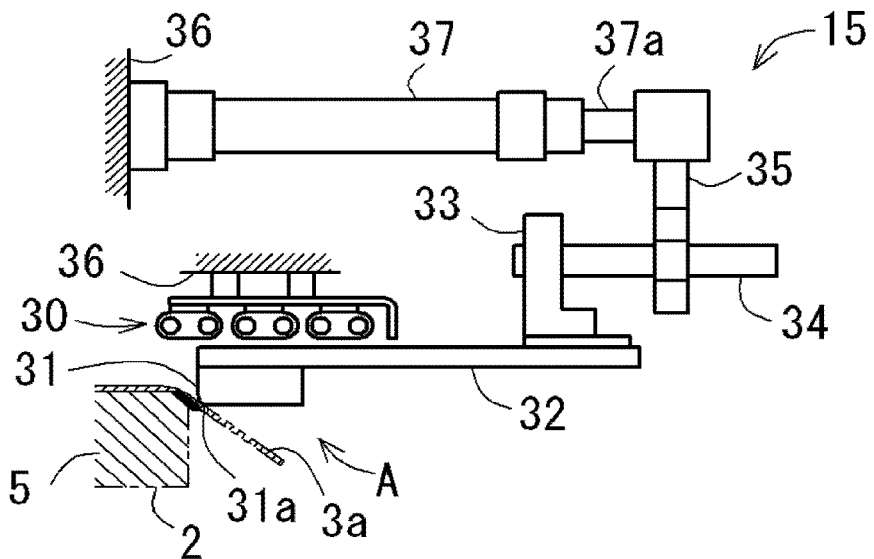
FIG. 3 is a view taken in a direction of arrow III in FIG. 2, in which (a) shows a facing state of a first bending member with respect to a heater, and (b) shows a retracting state of the first bending member with respect to the heater.
Figure 3:
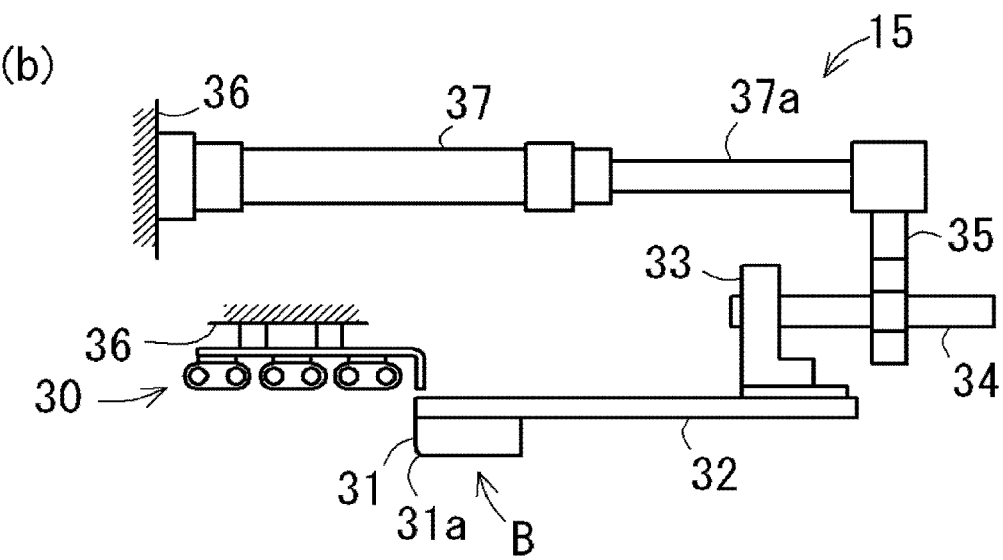
Figure 4:
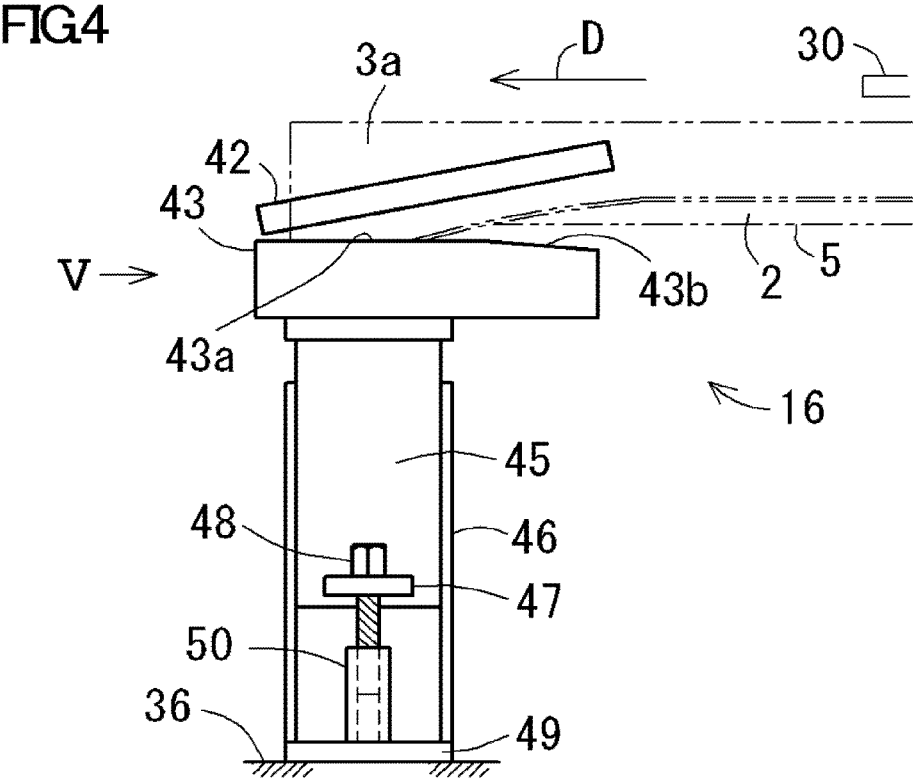
FIG. 4 is a side view of a bonding unit according to the Example.

As the method for manufacturing a coated product according to the present embodiment, there is indicated, for example, a form in which, in the heating step, the bending margin (3a) is heated by a heater (30) and is bent by a first bending member (31) that is arranged so as to face the heater, and, in the bonding step, the bending margin (3a) is bent by a second bending member (42) that is arranged so as to be spaced apart from the heater (30) on a downstream side in a transport direction (D) of the laminate (5) (see, for example, FIGS. 3 and 4).

In the case of the above form, for example, the first bending member (31) can be provided so as to be switchable between a facing state (A) in which it faces the heater (30) and a retracting state (B) in which it retracts to a lateral side of the heater (30) (see, for example, FIG. 3).

Figure 2:
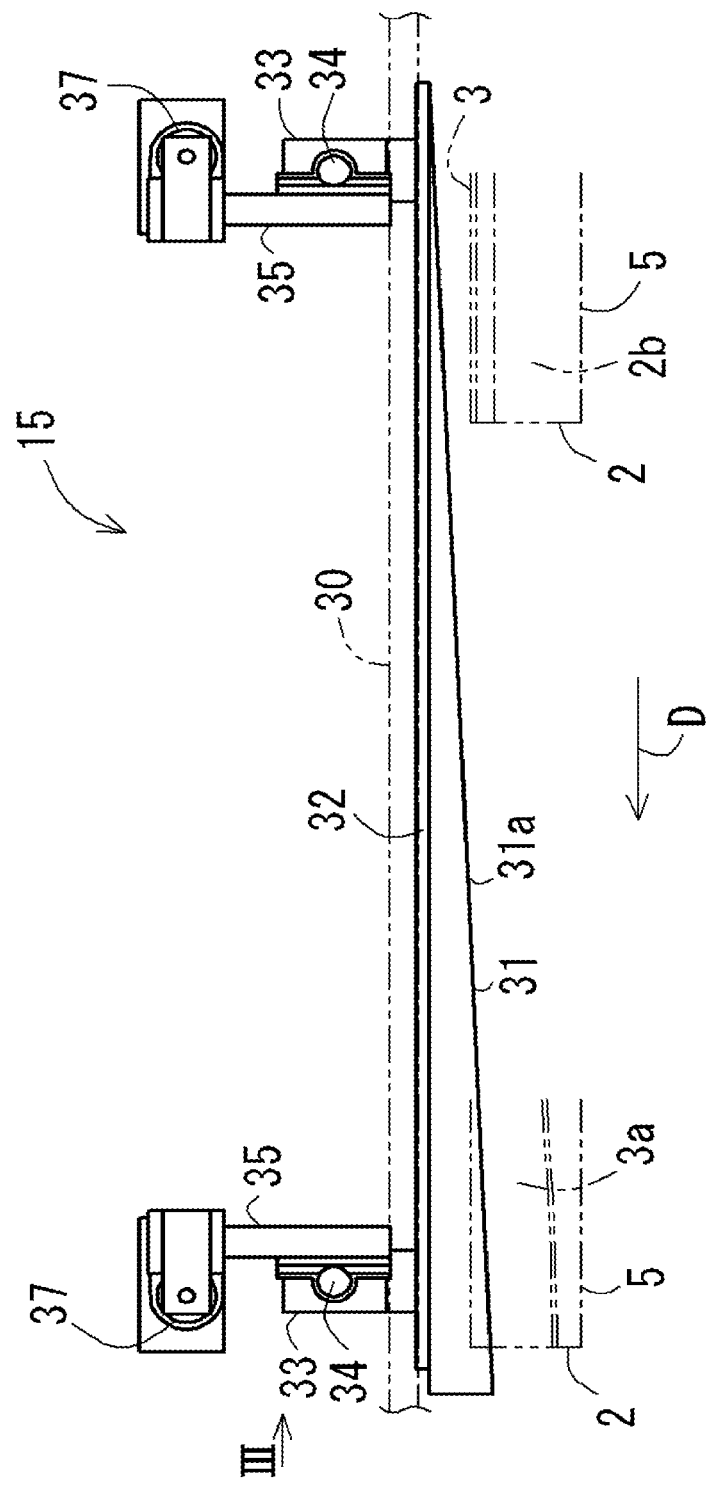
FIG. 2 is a side view of a heating unit according to the Example.

In the case of the above form, for example, in the heating step, the bending margin (3a) can be bent by being brought into abutment on an inclined surface (31a) formed in the first bending member (31) (see, for example, FIG. 2).

As the method for manufacturing a coated product according to the present embodiment, for example, in the heating step, the bending margin (3a) can be bent at a bending angle ($\theta 2$) of 30 to 70% (preferably 40 to 60%) of the total bending angle ($\theta 1$) when the bending margin (3a) is bonded to the side surface (2b) of the substrate (see, for example, FIGS. 7 and 8).

<Device for Manufacturing Coated Product>

The device for manufacturing a coated product according to the present embodiment is a device (11) for manufacturing a coated product (1) in which a surface (2a) and a side surface (2b) of a substrate (2) are coated with a decorative material (3), the device including a transport unit (12) that transports a laminate (5) in which the decorative material (3) is bonded to the surface (2a) of the substrate; a heating unit (15) that heats a bending margin (3a) of the decorative material (3) projecting outward from the side surface (2b) of the substrate during transport of the laminate; and a bonding unit (16) that bonds the bending margin (3a) heated in the heating unit (15) during transport of the laminate in a non-heated state to bond the bending margin to the side surface (2b) of the substrate (for example, see FIGS. 7 and 8). Then, the heating unit (15) bends the bending margin (3a) being heated in a half-folded state toward the side surface (2b) of the substrate, and the bonding unit (16) further bends the bending margin (3a) bent in the half-folded state in the heating unit (15) to bond the bending margin to the side surface (2b) of the substrate.

Figure 5:
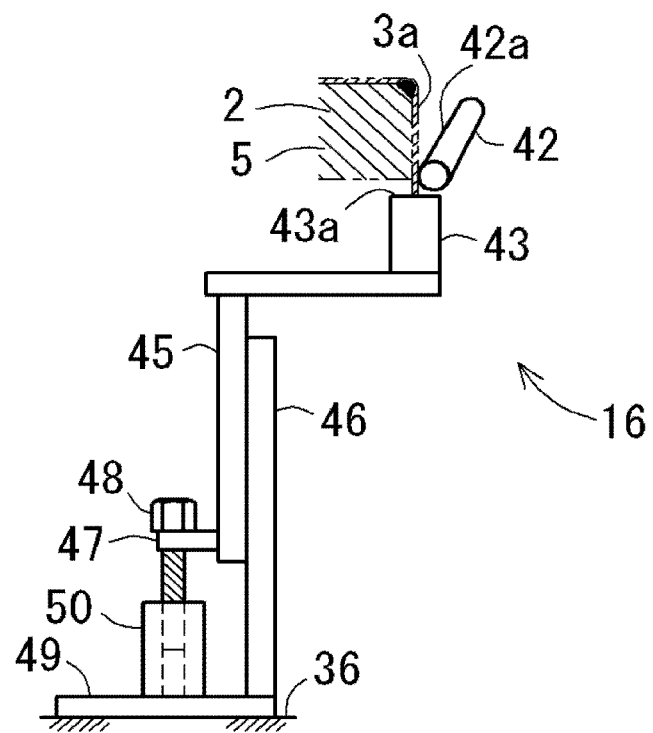
FIG. 5 is a view taken in a direction of arrow V in FIG. 4.

As the device for manufacturing a coated product according to the present embodiment, there is indicated, for example, a form in which the bonding unit (16) includes an abutment base (43) on which a tip of the bending margin (3a) abuts when the bending margin (3a) is bonded to the side surface (2b) of the substrate (for example, see FIGS. 4 and 5). In this case, for example, the abutment base (43) can be provided so that the height position can be adjusted with respect to a frame (36) side.

As the device for manufacturing a coated product according to the present embodiment, there is indicated, for example, a form in which the heating unit (15) includes a heater (30) that heats the bending margin (3a) and a first bending member (31) that is arranged so as to face the heater to bend the bending margin (3a), and the bonding unit (16) includes a second bending member (42) that is arranged so as to be spaced apart from the heater (30) on a downstream side in a transport direction (D) of the laminate (5) to bend the bending margin (3a) (see, for example, FIGS. 3 and 4).

As the device for manufacturing a coated product according to the present embodiment, there is indicated, for example, a form in which one or more configurations described for the method for manufacturing a coated product according to the above-described embodiment is/are employed.

<Another Method for Manufacturing Coated Product>

Another method for manufacturing a coated product (1) according to the present embodiment is a method for manufacturing a coated product in which a surface (2a) and a side surface (2b) of a substrate (2) are coated with a decorative material (3), the method including a transport step of transporting a laminate (5) in which a decorative material (3) is bonded to a surface (2a) of the substrate; a heating step of heating a bending margin (3a) of the decorative material (3) projecting outward from a side surface (2b) of the substrate during transport of the laminate; and a bonding step of bending the bending margin (3a) heated in the heating step during transport of the laminate in a non-heated state to bond the bending margin to the side surface (2b) of the substrate (see, for example, FIGS. 7 and 8). Then, in the bonding step, a tip of the bending margin (3a) is brought into abutment on an abutment base (43) when the bending margin (3a) is bonded to the side surface (2b) of the substrate (see, for example, FIG. 8(b)).

<Another Device for Manufacturing Coated Product>

Another device for manufacturing a coated product according to the present embodiment is a device (11) for manufacturing a coated product (1) in which a surface (2a) and a side surface (2b) of a substrate (2) are coated with a decorative material (3), the device including a transport unit (12) that transports a laminate (5) in which the decorative material (3) is bonded to the surface (2a) of the substrate; a heating unit (15) that heats a bending margin (3a) of the decorative material (3) projecting outward from the side surface (2b) of the substrate during transport of the laminate; and a bonding unit (16) that bonds the bending margin (3a) heated in the heating unit during transport of the laminate in a non-heated state to bond the bending margin to the side surface (2b) of the substrate (for example, see FIGS. 7 and 8). Then, the bonding unit (16) includes an abutment base (43) on which a tip of the bending margin (3a) abuts when the bending margin (3a) is bonded to the side surface (2b) of the substrate (see, for example, FIG. 8(b)).

Note that reference numerals in parentheses attached to the respective components described in the above-described embodiments indicate correspondence relationships with specific components described in the Example which will be described later.

EXAMPLE

Figure 9:
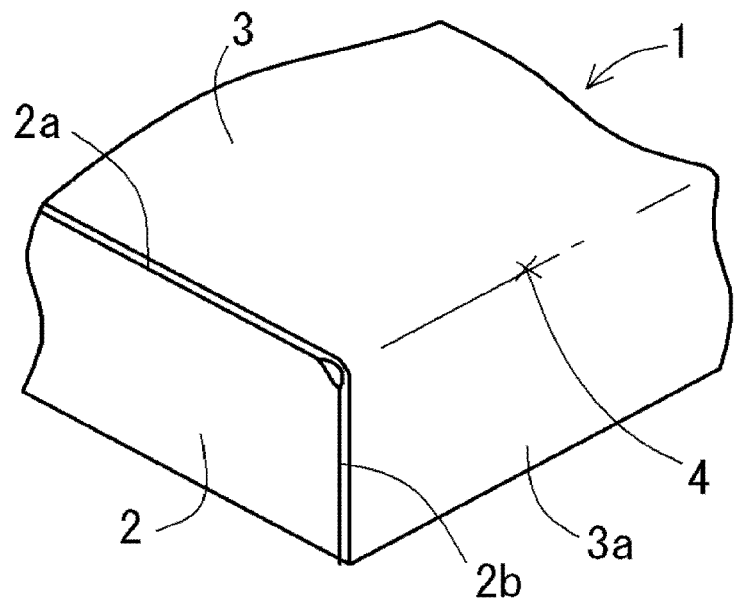
FIG. 9 is a perspective view of an essential part of a coated product obtained by the method for manufacturing a coated product.

Hereinafter, the present invention will be described in detail by way of an Example with reference to the accompanying drawings. In the present example, a coated product 1 in which a surface 2a and one side surface 2b of a substrate 2 made of particle board are coated with a decorative material 3 made of melamine resin, as shown in FIG. 9, is exemplified as the "coated product" according to the present invention. An outer corner curved surface part 4 of the coated product 1 has an extremely small radius of curvature (for example, 1 to 5 mm).

(1) Configuration of Device for Manufacturing Coated Product

Figure 1:
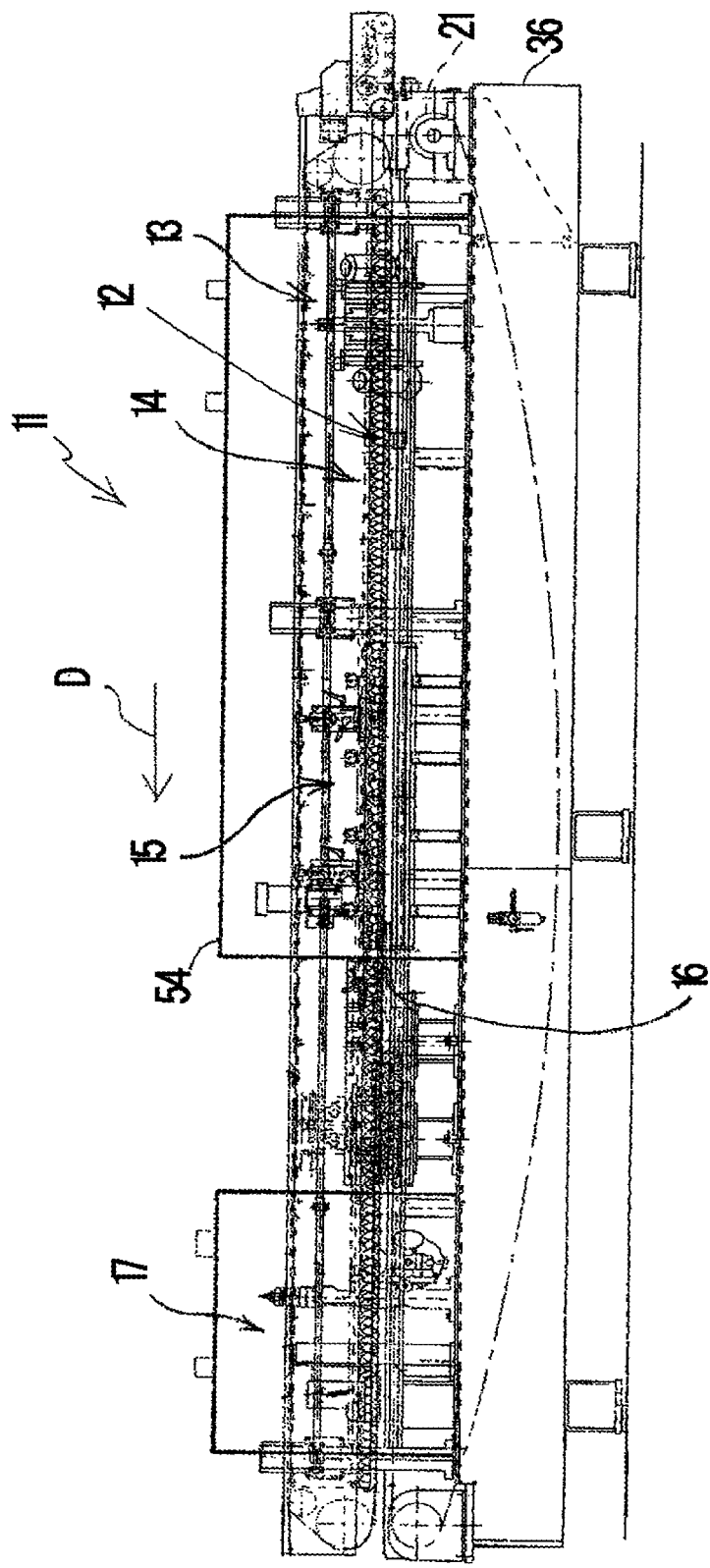
FIG. 1 is a side view of a device for manufacturing a coated product according to an Example.

As shown in FIG. 1, a device 11 for manufacturing a coated product according to the present example includes a transport unit 12, a cutting unit 13, an application unit 14, a heating unit 15, a bonding unit 16, and a trimming unit 17 which will be described below. These cutting unit 13, application unit 14, heating unit 15, bonding unit 16 and trimming unit 17 are arranged in order from the upstream side to the downstream side along the transport unit 12 (specifically, a conveyor 21 which will be described later).

The transport unit 12 includes a conveyor 21 that is arranged along the horizontal direction (see FIG. 6(a)). The conveyor 21 transports a laminate 5 in which the decorative material 3 is bonded to the surface 2a of the substrate 2 in a transport direction D. The laminate 5 is transported in the transport direction D in a state where the substrate 2 is positioned on the lower side and the decorative material 3 is positioned on the upper side. Further, in the laminate 5 transported on the upstream side (inlet side) of the conveyor 21, a bending margin 3a of the decorative material 3 projects horizontally outward from the side surface 2b of the substrate 2.

The cutting unit 13 includes a rotary cutter 22 that cuts a corner on the surface side of the substrate 2 to which the decorative material 3 is bonded, and also cuts a portion, which is continuous with the corner, on the back surface side of the bending margin 3a of the decorative material 3 (see FIG. 6(b)). Cutting by the rotary cutter 22 allows simultaneous formation of notches 24 in the corner of the substrate 2 and on the back surface side of the bending margin 3a of the decorative material 3.

The application unit 14 includes an application nozzle 26 that applies a hot-melt adhesive 25 to each notch 24 formed in the substrate 2 and the decorative material 3 by the cutting unit 13 (see FIG. 6(c)). Further, the application unit 14 includes an application nozzle 27 that applies the hot-melt adhesive to the side surface 2b of the substrate 2 and the back surface of the bending margin 3a of the decorative material 3.

As shown in FIGS. 2 and 3, the heating unit 15 includes a long heater 30 that heats the bending margin 3a of the decorative material 3. The heater 30 is arranged along the transport direction D of the laminate 5 so as to heat the bending margin 3a from above. Further, the heater 30 is constantly operating regardless of the transport state of the laminate 5. The heating temperature of the bending margin 3*a* by the heater 30 is set to 160 to 180° C.

The heating unit 15 includes a first bending member 31 that is arranged so as to face the heater 30 to bend the bending margin 3*a* in a half-folded state toward the side surface 2*b* of the substrate 2. The first bending member 31 is made of ceramics and formed in a long shape. Further, the first bending member 31 is arranged along the transport direction D of the laminate 5. An inclined surface 31*a* is formed on the lower surface side of the first bending member 31, the inclined surface 31*a* being inclined downward toward the downstream side in the transport direction D of the laminate 5. A side edge of the inclined surface 31*a* abuts on the bending margin 3*a* to bend the bending margin 3*a* at a bending angle θ2 (see FIG. 7(*c*)). The bending angle θ2 is a value of about 50% (for example, 45 degrees) of the total bending angle θ1 (see FIG. 8(*c*); for example, 90 degrees) when the bending margin 3*a* is bonded to the side surface 2*b* of the substrate 2. The side edge of the inclined surface 31*a* is formed in an arc shape in a longitudinal section.

The first bending member 31 is provided so as to be switchable between a facing state A in which it faces the heater 30 (specifically, a facing state Ain which it is positioned immediately below the heater 30) and a retracting state B in which it retracts to a lateral side of the heater 30 (specifically, a retracting state B in which it is spaced apart from the position immediately below the heater 30) (see FIG. 3). Specifically, the first bending member 31 is attached to a lower surface of a support plate 32. On an upper surface of the support plate 32, a pair of brackets 33 are raised. A connecting rod 34 extending in the horizontal direction is attached to each of the brackets 33. The connecting rod 34 is attached to a support arm 45. The upper end side of the support arm 35 is connected to a piston rod 37*a* of a cylinder 37 attached to a frame 36 side. The cylinder 37 is arranged along the horizontal direction orthogonal to the transport direction D of the laminate 5. Therefore, the first bending member 31 is brought into the facing state A due to the contraction of the piston rod 37*a* of the cylinder 37, and, on the other hand, is brought into the retracting state B due to the extension of the piston rod 37*a* of the cylinder 37.

The cylinder 37 is contracted when the laminate 5 is transported to the heater 30, and, on the other hand, is extended when the laminate 5 is not transported to the heater 30, by a detecting means such as a sensor.

As shown in FIGS. 4 and 5, the bonding unit 16 includes a second bending member 42 that is arranged so as to be spaced apart from the heater 30 on the downstream side in the transport direction D of the laminate 5. The second bending member 42 further bends the bending margin 3*a* which is bent in the half-folded state by the heating unit 15 to bond the bending margin 3*a* to the side surface 2*b* of the substrate 2. The second bending member 42 is made of a metal and formed in a rod shape. The second bending member 42 is arranged so as to be inclined with respect to the transport direction D of the laminate 5. Further, the second bending member 42 has a bending surface 42*a* on which the bending margin 3*a* abuts to thereby be bent. Further, the second bending member 42 is arranged at a position sufficiently distant from the heater 30 so that the heating by the heater 30 does not act thereon. The heating unit 15 is covered with a cover 54 and partitioned from the bonding unit 16 (see FIG. 1).

The bonding unit 16 includes an abutment base 43 on which a tip (specifically, a lower end) of the bending margin 3*a* abuts when the bending margin 3*a* is bonded to the side surface 2*b* of the substrate 2. An upper surface of the abutment base 43 is formed with a horizontal abutment surface 43*a* on which the tip of the bending margin 3*a* abuts. Further, the upper surface of the abutment base 43 is formed with an inclined surface 43*b* which is continuous with the upstream side in the transport direction D of the laminate 5 of the abutment surface 43*a* and which is inclined downward toward the upstream side. The inclined surface 43*b* has a function of suppressing the application of an extreme reaction force to the bending margin 3*a* at the initial stage of bending by the second bending member 42.

The abutment base 43 is provided so that the height position can be adjusted with respect to the frame 36 side. Specifically, a slider 45 is attached to the lower surface side of the abutment base 43. The slider 45 is supported by a guide 46 so as to be able to move up and down. Further, a support piece 47 is protrudingly provided in a lower part of the slider 45. A bolt 48 is attached to the support piece 47. A tip part of the bolt 48 is screwed into a female screw part 50 erected on a pedestal 49 attached to the frame 36 side. Therefore, by changing the screwing depth of the bolt 48 into the female screw part 50, the height position of the abutment base 43 is adjusted.

The trimming unit 17 includes a rotary cutter 52 that removes a tip of the bending margin 3*a* of the decorative material 3 bonded to the side surface 2*b* of the substrate 2 (specifically, a lower end of the bending margin 3*a* protruding downward from the side surface 2*b* of the substrate 2) (see FIG. 8(*c*)).

(2) Method for Manufacturing Coated Product

Figure 6:
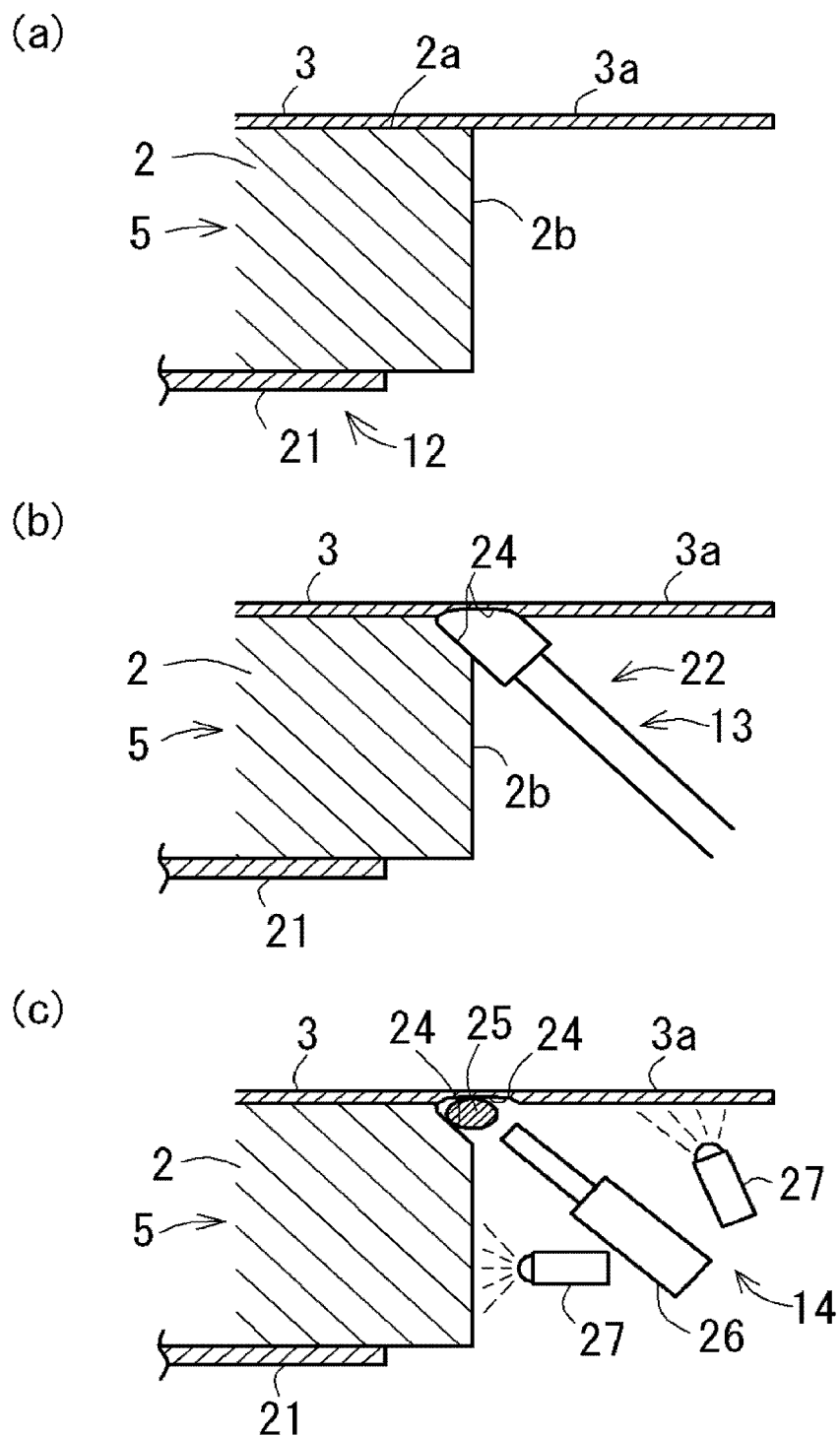
FIG. 6 is an explanatory view for explaining a method for manufacturing a coated product according to the Example, in which (a) shows an initial state of a step of transporting a laminate, (b) shows a step of cutting a substrate and a decorative material, and (c) shows a step of applying an adhesive to the substrate and the decorative material.

Next, a method for manufacturing a coated product using the device 11 for manufacturing a coated product having the above configuration will be described. This method for manufacturing a coated product includes a transport step, a cutting step, an application step, a heating step, a bonding step, and a trimming step which will be described below. The cutting step, application step, heating step, bonding step and trimming step are sequentially performed during transport of the laminate 5 in the transport step. In FIGS. 6 to 8, the transport direction D of the laminate 5 is a direction orthogonal to the paper surface and directed toward the front side.

In the transport step, the laminate 5 in which the decorative material 3 is bonded to the surface 2*a* of the substrate 2 is transported in the transport direction D by the conveyor 21, as shown in FIG. 6(*a*). In the initial stage of transport of the laminate 5, the bending margin 3*a* of the decorative material 3 projects horizontally outward from the side surface 2*b* of the substrate 2. The bending margin 3*a* is cut at its tip end by a rotary cutter (not shown) and trimmed to a predetermined projection length.

In the above cutting step, as shown in FIG. 6(*b*), the rotary cutter 22 cuts the corner on the surface side of the substrate 2 to which the decorative material 3 is bonded, and cuts a portion, which is continuous with the corner, on the back side of the bending margin 3*a* of the decorative material 3. This allows simultaneous formation of notches 24 in the corner of the substrate 2 and on the back surface side of the bending margin 3*a* of the decorative material 3.

In the above application step, as shown in FIG. 6(*c*), the hot-melt adhesive 25 is applied to the notches 24 formed in the substrate 2 and the decorative material 3, respectively, by the application nozzle 26. The hot-melt adhesive 25 has a function of maintaining the product strength as well as a function of bonding the bending margin 3*a* of the decorative material 3 to the side surface 2*b* of the substrate 2. Further, in the application step, the hot-melt adhesive is applied to the side surface 2b of the substrate 2 and the back surface of the bending margin 3a of the decorative material 3 by the application nozzle 27.

In the heating step, as shown in FIG. 7(a), the bending margin 3a of the decorative material 3 is heated from above by the heater 30. Further, in the heating step, as shown in FIGS. 7(b) and 7(c), the bending margin 3a of the decorative material 3 abuts on the inclined surface 31a of the first bending member 31 and is pressed, so that the bending margin 3a being heated by a heater 30 is bent in a half-folded state toward the side surface 2b of the substrate 2 at a bending angle θ2.

Here, as shown in FIG. 3, the first bending member 31 is brought into the facing state A when the laminate 5 is transported to the heater 30, and, on the other hand, is brought into the retracting state B when the laminate 5 is not transported to the heater 30. Therefore, overheating of the first bending member 31 by the heater 30 is suppressed.

In the bonding step, as shown in FIGS. 8(a) and 8(b), the bending margin 3a of the decorative material 3 bent in the half-folded state in the heating step abuts on the bending surface 42a of the second bending member 42 and is pressed. As a result, the bending margin 3a is bent in the non-heated state and bonded to the side surface 2b of the substrate 2. When the bending margin 3a is bonded to the side surface 2b of the substrate 2, a lower end of the bending margin 3a abuts on the abutment base 43 so that the downward falling thereof is restricted (see FIG. 8(b)). In the abutment state of the bending margin 3a, a lower surface of the substrate 2 does not abut on the abutment base 43.

In the trimming step, as shown in FIG. 8(c), the lower end of the bending margin 3a of the decorative material 3 protruding downward from the side surface 2b of the substrate 2 is removed by the rotary cutter 52. As a result, the coated product 1 having the outer corner curved surface part 4 having a minimal radius of curvature (for example, 1 to 5 mm), as shown in FIG. 9, is obtained.

(3) Effects of Example

The method for manufacturing a coated product of the present example includes the transport step of transporting the laminate 5 in which the decorative material 3 is bonded to the surface 2a of the substrate 2; the heating step of heating the bending margin 3a of the decorative material 3 projecting outward from the side surface 2b of the substrate 2 during transport of the laminate 5; and the bonding step of bending the bending margin 3a heated in the heating step during transport of the laminate 5 in the non-heated state to bond the bending margin 3a to the side surface 2b of the substrate 2. In the heating step, the bending margin 3a being heated is bent in the half-folded state toward the side surface 2b of the substrate 2. In the bonding step, the bending margin 3a bent in the half-folded state in the heating step is further bent to be bonded to the side surface 2b of the substrate 2. Accordingly, in the heating step, the bending margin 3a being heated is bent in the half-folded state, so that the bending margin 3a is suppressed from undulating so that the bending margin 3a is uniformly heated. Further, in the bonding step, since the bending margin 3a bent in the half-folded state is bent in the non-heated state, the bending margin 3a is smoothly bent and bonded to an appropriate position on the side surface 2b of the substrate 2. As a result, even when the outer corner curved surface 4 of the coated product 1 has an extremely small radius of curvature, the occurrence of sagging or cracking at the outer corner curved surface part 4 of the coated product 1 is suppressed.

In the present example, in the bonding step, the tip of the bending margin 3a is brought into abutment on the abutment base 43 when the bending margin 3a is bonded to the side surface 2b of the substrate 2. Thus, the tip of the bending margin 3a is restricted by the abutment base 43 at the time of bonding the bending margin 3a, so that the bending margin 3a is more smoothly bent and bonded to a more appropriate position of the side surface 2b of the substrate 2.

In the present example, the abutment base 43 is provided so that the height position can be adjusted with respect to the frame 36 side. Thus, the height position of the abutment base 43 can be adjusted according to the shape and the like of the coated product 1.

Further, in the present example, in the heating step, the bending margin 3a is heated by the heater 30 and bent by the first bending member 31 arranged so as to face the heater 30. In the bonding step, the bending margin 3a is bent by the second bending member 42 that is arranged 3 to be spaced apart from the heater 30 on the downstream side in the transport direction D of the laminate 5. Thus, the bending margin 3a being heated by the heater 30 is effectively bent by the first bending member 31, and is effectively bent by the second bending member 42 in the non-heated state.

In the present example, the first bending member 31 is provided so as to be switchable between the facing state A in which it faces the heater 30 and the retracting state B in which it retracts to the lateral side of the heater 30. Accordingly, the first bending member 31 is switched between the facing state A and the retracting state B according to the transport state of the laminate 5, so that overheating of the first bending member 31 by the heater 30 is suppressed, and that the bending margin 3a is effectively bent by the first bending part 31.

In the present example, in the heating step, the bending margin 3a is bent by being brought into abutment on the inclined surface 31a formed in the first bending member 31. Thus, the bending margin 3a is effectively bent by the first bending part 31.

Further, in the present example, in the heating step, the bending margin 3a is bent at the bending angle θ2 of about 50% of the total bending angle θ1 when the bending margin 3a is bonded to the side surface 2b of the substrate 2. Thus, the bending margin 3a is effectively bent by the first and second bending members 31 and 42.

The present invention is not limited to the above-described example, and can be variously modified within the scope of the present invention depending on the purpose and use. Specifically, in the above-described example, the tip of the bending margin 3a abuts on the abutment base 43 when the bending margin 3a of the decorative material 3 is bonded to the side surface 2b of the substrate 2, but the present invention is not limited to this. For example, the tip of the bending margin 3a may not be restricted at all when the bending margin 3a of the decorative material 3 is bonded to the side surface 2b of the substrate 2.

Further, in the above-described example, the heater 30 that heats the bending margin 3a of the decorative material 3 from above has been exemplified, but the present invention is not limited to this. For example, there may be provided a heater that heats the bending margin 3a of the decorative material 3 from below, in addition to or in place of the heater 30.

Further, in the above-described example, the long first and second bending members 31 and 42 have been exemplified, but the present invention is not limited thereto. For example, instead of or in addition to these bending members, bending members each composed of a roller, a plurality of blocks or the like may be employed.

In the above-described example, the laminate 5 is transported in a state where the substrate 2 is positioned on the lower side and the decorative material 3 is positioned on the upper side, but the present invention is not limited to this. For example, the laminate 5 may be transported in a state where the substrate 2 is positioned on the upper side and the decorative material 3 is positioned on the lower side.

Figure 10:
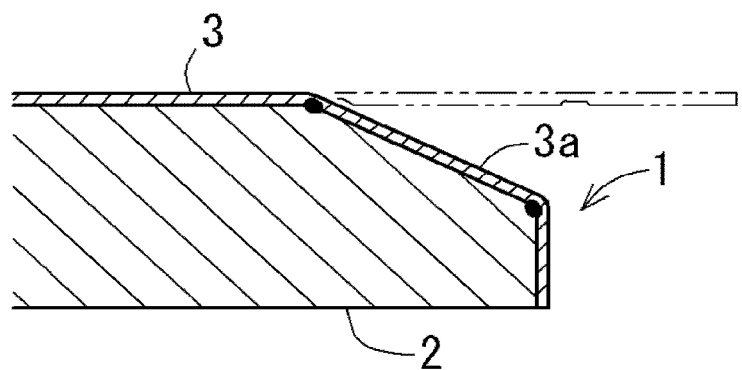
FIG. 10 is an explanatory view for explaining coated products according to other forms, in which (a) shows a longitudinal section of an essential part of a coated product in which a bending margin of a decorative material is bent at a plurality of positions, and (b) shows a longitudinal section of an essential part of a coated product whose outer corner curved surface part has a relatively large radius of curvature.
Figure 10:
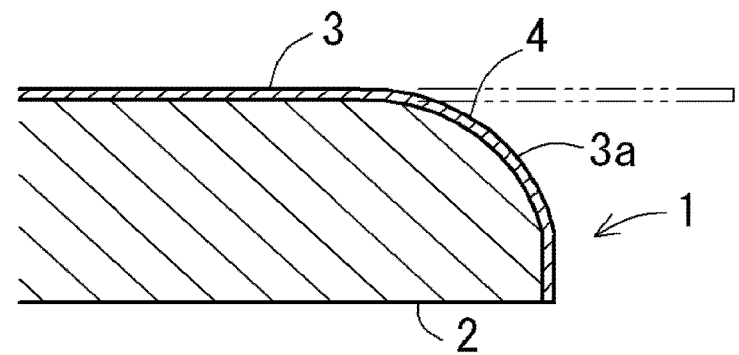

Further, in the above-described example, the coated product 1 in which the bending margin 3a of the decorative material 3 is bent at one position has been exemplified, but the present invention is not limited to this. For example, as shown in FIG. 10(*a*), a coated product 1 in which the bending margin 3a of the decorative material 3 is bent at a plurality of positions may be manufactured. Further, in the above-described example, the coated product 1 having the outer corner curved surface part 4 having a minimum radius of curvature has been exemplified, but the present invention is not limited to this. For example, as shown in FIG. 10(*b*), a coated product 1 in which the outer corner curved surface part 4 has a relatively large radius of curvature may be manufactured.

Figure 11:
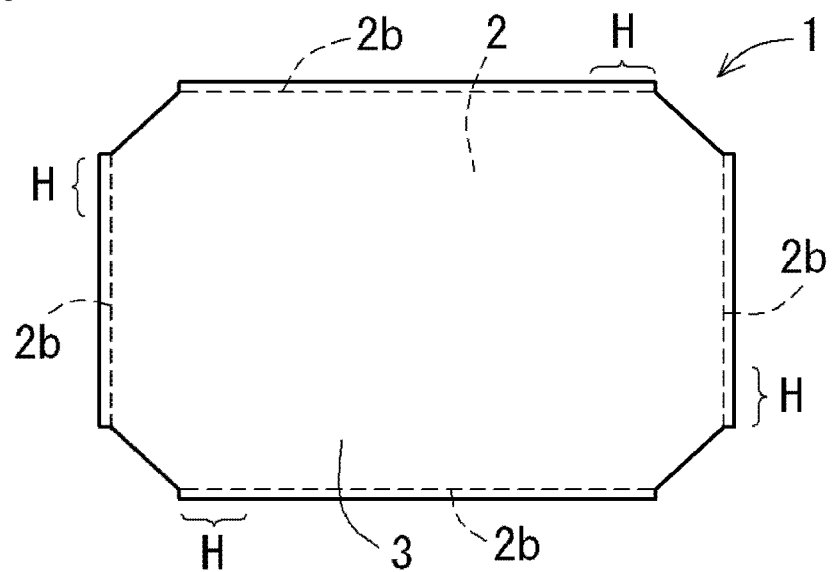
FIG. 11 is a plan view of a general coated product.
Figure 12:
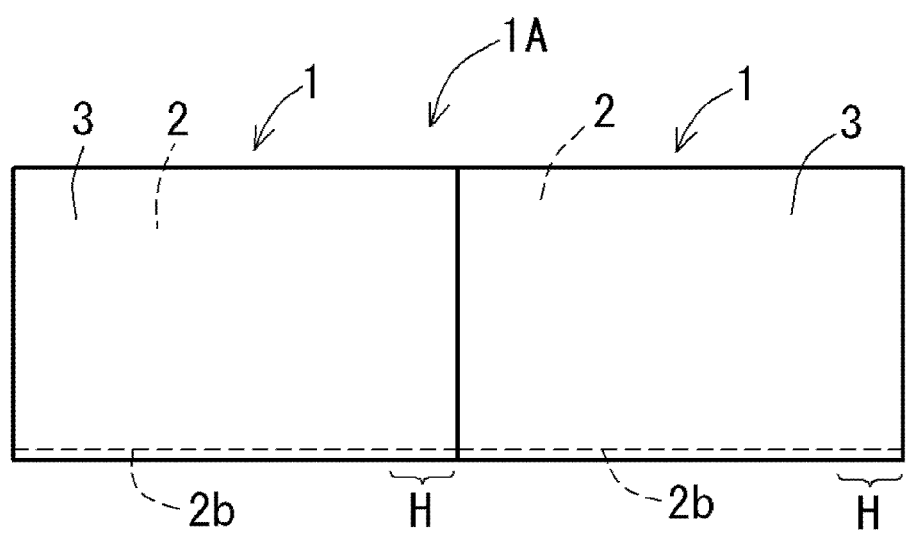
FIG. 12 is a plan view of a general connected product.

Further, in the above-described example, the coated product 1 in which only one side surface 2b of the substrate 2 is coated with the decorative material 3 has been exemplified, but the present invention is not limited to this. For example, as shown in FIG. 11, a coated product 1 in which a plurality of side surfaces 2b of the substrate 2 are coated with the decorative material 3 may be manufactured. Further, for example, as shown in FIG. 12, a connected product 1A obtained by connecting a plurality of the coated products 1 may be manufactured. According to the method for manufacturing a coated product of the present invention, even in the case of the coated products 1 and connected product 1A described above, sagging or cracking does not occur at the outer corner curved surface part, so that the design is enhanced.

Furthermore, in the above-described example, the coated product 1 in which only one surface 2a of the substrate 2 is coated with the decorative material 3 has been exemplified, but the present invention is not limited to this. For example, a coated product 1 in which both surfaces 2a of the substrate 2 are covered with the decorative material 3 may be manufactured.

The present invention is not limited to the embodiments described in detail above, and various modifications or changes can be made within the scope of the claims of the present application.

INDUSTRIAL APPLICABILITY

The present invention is widely used as a technique for manufacturing a coated product in which a surface and a side surface of a substrate are coated with a decorative material. In particular, it is suitably used as a technology for manufacturing coated products for building materials for various counters, top boards, doors, floors, walls, and the like.

REFERENCE SIGNS LIST

1 Coated product
2 Substrate
2a Surface
2b Side surface
3 Decorative material
3a Bending margin
5 Laminate
11 Device for manufacturing coated product
12 Transport unit
15 Heating unit
16 Bonding unit
30 Heater
31 First bending member
31a Inclined surface
42 Second bending member
43 Abutment base
A Facing state
B Retracting state
D Transport direction
θ1 Total bending angle
θ2 Bending angle

The invention claimed is:

1. A method for manufacturing a coated product in which a surface and a side surface of a substrate are coated with a decorative material, the method comprising:

a transport step of transporting a laminate in which the decorative material is bonded to the surface of the substrate;

a heating step of heating a bending margin of the decorative material projecting outward from the side surface of the substrate during transport of the laminate; and a bonding step of bending the bending margin heated in the heating step during transport of the laminate in a non-heated state to bond the bending margin to the side surface of the substrate, wherein, in the heating step, the bending margin being heated is bent in a half-folded state toward the side surface of the substrate, and wherein, in the bonding step, the bending margin bent in the half-folded state in the heating step is further bent to be bonded to the side surface of the substrate.

2. The method for manufacturing a coated product according to claim 1, wherein, in the bonding step, a tip of the bending margin is brought into abutment on an abutment base when the bending margin is bonded to the side surface of the substrate.

3. The method for manufacturing a coated product according to claim 1, wherein, in the heating step, the bending margin is heated by a heater and bent by a first bending member that is arranged so as to face the heater, and wherein, in the bonding step, the bending margin is bent by a second bending member that is arranged so as to be spaced apart from the heater on a downstream side in a transport direction of the laminate.

4. The method for manufacturing a coated product according to claim 3, wherein the first bending member is provided so as to be switchable between a facing state in which it faces the heater and a retracting state in which it retracts to a lateral side of the heater.

5. The method for manufacturing a coated product according to claim 3, wherein, in the heating step, the bending margin is bent by being brought into abutment on an inclined surface formed in the first bending member.

6. The method for manufacturing a coated product according to claim 1, wherein, in the heating step, the bending margin is bent at a bending angle of 30 to 70% of the total bending angle when the bending margin is bonded to the side surface of the substrate.

7. A device for manufacturing a coated product in which a surface and a side surface of a substrate are coated with a decorative material, the device comprising:

a transport unit that transports a laminate in which the decorative material is bonded to the surface of the substrate;

a heating unit that heats a bending margin of the decorative material projecting outward from the side surface of the substrate during transport of the laminate; and a bonding unit that bonds the bending margin heated in the heating unit during transport of the laminate in a non-heated state to bond the bending margin to the side surface of the substrate, wherein the heating units bends the bending margin being heated in a half-folded state toward the side surface of the substrate, and wherein the bonding unit further bends the bending margin bent in the half-folded state in the heating unit to bond the bending margin to the side surface of the substrate.

\* \* \* \* \*